(12) United States Patent
Liu

(10) Patent No.: US 6,820,633 B2
(45) Date of Patent: Nov. 23, 2004

(54) THERMALLY-SENSITIVE SAFETY DEVICE FOR GAS TUBING

(76) Inventor: Chih-Hung Liu, No. 564-1, Dungguan Rd., Dungshr Jen, Taichung (TW)

( * ) Notice: Subject to any disclaimer, the term of this patent is extended or adjusted under 35 U.S.C. 154(b) by 0 days.

(21) Appl. No.: 10/291,729

(22) Filed: Nov. 12, 2002

(65) Prior Publication Data

US 2004/0091016 A1 May 13, 2004

(51) Int. Cl.[7] .............................................. F16K 17/38
(52) U.S. Cl. .............................. 137/73; 137/74; 137/75; 137/460
(58) Field of Search .............................. 137/72–75, 460

(56) References Cited

U.S. PATENT DOCUMENTS

| | | | | |
|---|---|---|---|---|
| 3,850,189 A | * | 11/1974 | Follett | 137/75 |
| 4,422,503 A | * | 12/1983 | Goans | 137/75 |
| 4,745,940 A | * | 5/1988 | Ely | 137/75 |
| 4,787,416 A | * | 11/1988 | Chuang | 137/460 |
| 4,836,247 A | * | 6/1989 | Chuang | 137/460 |
| 6,155,285 A | * | 12/2000 | Hsiao | 137/75 |

* cited by examiner

Primary Examiner—Diego Gutierrez
Assistant Examiner—Stanley J. Pruchnic, Jr.
(74) Attorney, Agent, or Firm—Browdy and Neimark, P.L.L.C.

(57) ABSTRACT

The present invention is to provide a thermally-sensitive safety device for gas tubing including a main body provided with an inlet, an outlet and a gas passage communicated with said inlet and said outlet, and a thermally-sensitive control valve mounted in the gas passage. The control valve has a ball, which is normally biased by a spring to stop against a thermally-sensitive member, and a bushing with through hole in alignment with the ball. The thermally-sensitive member melts while ambient temperature is higher than the melting point thereof, whereby said ball is biased by said spring to contact against and seal the through hole of the bushing such that the gas passage is blocked off.

3 Claims, 2 Drawing Sheets

THERMALLY-SENSITIVE SAFETY DEVICE FOR GAS TUBING

FIELD OF THE INVENTION

The present invention relates generally to a safety device for gas tubing, and more particularly to a thermally-sensitive safety device for gas tubing.

BACKGROUND OF THE INVENTION

Although the modern families are well equipped with facilities of supplying gas, water, and electricity so as to provide the family life with convenience. However, the occurrence of accidents may be relatively increased. Therefore, as far as the facility of gas supply is concerned, overflow control valves will be installed on gas tubing in most of families to prevent gas leakage. The overflow control valve works like that when the gas tubing ruptures, the pressure difference generated by different flow speed of the gas drives a ball to block off a gas passage through which fluids flow, thereby the gas supply is stopped.

However, the aforementioned overflow control valve can automatically block off the gas passage to prevent the gas from explosion while the gas tubing ruptures, but the overflow control valve fails to detect the situation of the gas tubing on fire or ambient temperature being abnormally high. In other words, the overflow control valve is still not safe enough.

SUMMARY OF THE INVENTION

The primary objective of the present invention is to provide a thermally-sensitive safety device for gas tubing, automatically blocking off a gas passage to avoid accidental explosion while ambient temperature is abnormally high.

The secondary objective of the present invention is to provide a thermally-sensitive safety device for gas tubing, automatically blocking off a gas passage while the gas is overflowed.

The foregoing objectives of the present invention are attained by the thermally-sensitive safety device for the gas tubing, including a main body, a thermally-sensitive control valve and an overflow control valve. The main body is provided with an inlet, an outlet and a gas passage communicated with said inlet and said outlet. The thermally-sensitive control valve has a restraining member, a biasing unit, a thermally-sensitive member and a stopping unit. The restraining member is mounted in the gas passage adjacent to the inlet and has an admission aperture in communication with the inlet for enabling entry of gas into the gas passage. The biasing unit is mounted closely behind said restraining member and has an elastomer and a ball biased by said elastomer. The thermally-sensitive member is installed in the gas passage and has a receiving space for receiving a distal end of said restraining member, said elastomer and said ball, and a stopping portion disposed at a distal end thereof for stopping and keeping said ball in said receiving space in normal situation. The stopping unit is mounted in the gas passage behind said thermally-sensitive member and has a bushing with a through hole in alignment with said ball, and an oil seal installed in the through hole of the bushing. Wherein the through hole of the bushing has a larger inner diameter than said ball and said oil seal has a smaller inner diameter than said ball. Wherein said thermally-sensitive member melts while ambient temperature is higher than the melting point thereof, whereby said ball is biased by said elastomer to contact against the oil seal so as to seal the through hole of the bushing such that the gas passage is blocked off.

DETAILED DESCRIPTION OF THE INVENTION

Figure 1:
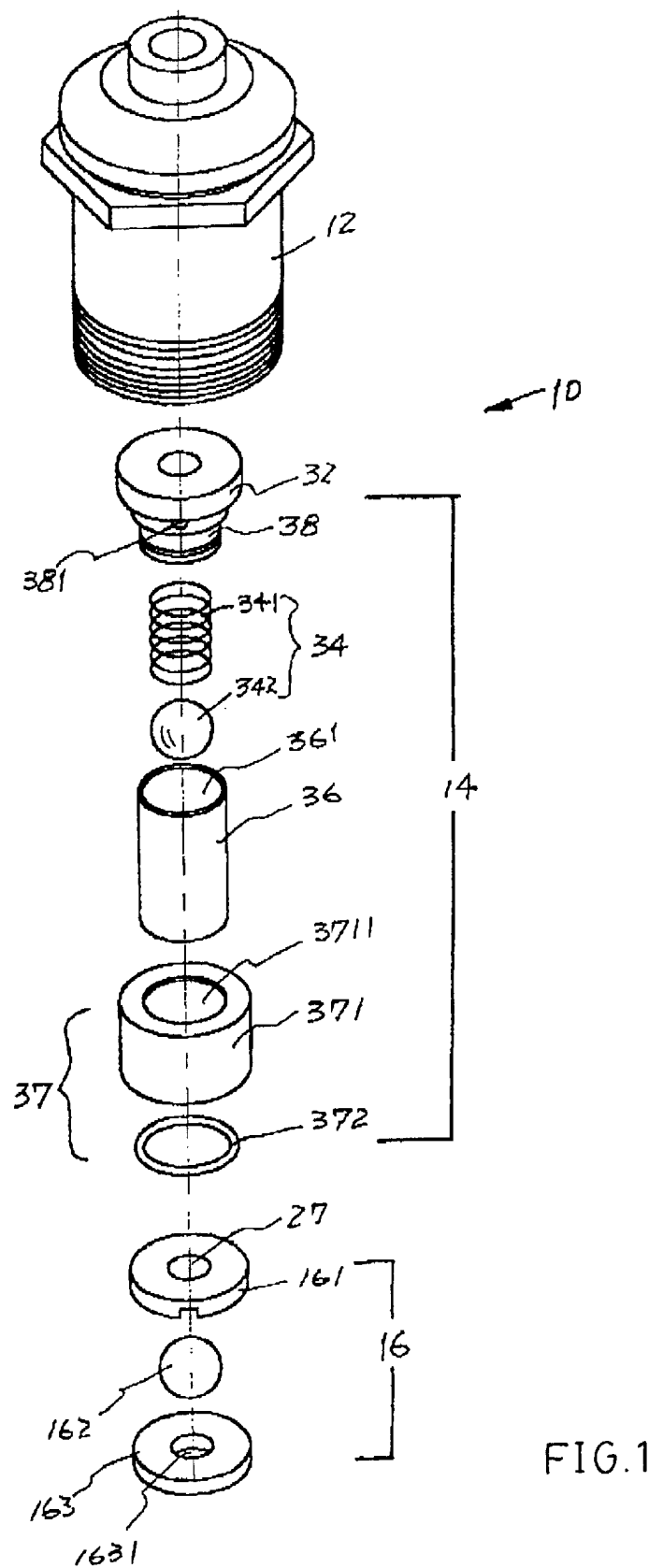
FIG. 1 is an exploded view of a preferred embodiment of the present invention.
Figure 2:
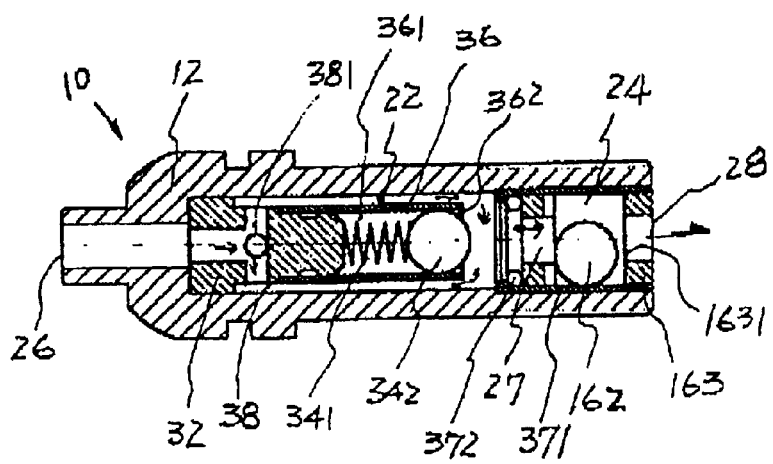
FIG. 2 is a sectional view of the preferred embodiment of the present invention, showing that an inlet communicates with an outlet.

Referring to FIGS. 1–2, a thermally-sensitive safety device 10 of the present invention includes a main body 12, a thermally-sensitive control valve 14 and an overflow control valve 16.

The main body 12 is provided with a gas passage defining a first chamber 22 for installation of the thermally-sensitive control valve 14 therein and a second chamber 24 for installation the overflow control valve 16 therein, an inlet 26, and an outlet 28. The first chamber 22, the second chamber 24 and the inlet 26 are located at a front side of the main body 12. The outlet 28 is located at a rear end of the main body 12. The inlet 26, the first chamber 22, the second chamber 24 and the outlet 28 communicate with one another.

The thermally-sensitive control valve 14 is composed of a restraining member 32, a biasing unit 34, a thermally-sensitive member 36, and a stopping unit 37. The restraining member 32, which has a stepped portion 38 and an admission aperture 381 for gas flowing in, is positioned in the first chamber 22 adjacent to the inlet 26. The biasing unit 34, which has an elastomer (embodied as a spring 341) and a ball 342, is positioned closely behind the restraining member 32. The spring 341 rests against a distal side of the restraining member 32 at an end thereof and pushes against the ball 342 at the other end thereof.

The thermally-sensitive member 36 has a receiving space 361 for receiving the stepped portion 38 of the restraining member 32, the spring 341, and the ball 342 and is provided with a stopping portion 362 at a distal end of the receiving space 361. The stopping portion 362 has a smaller diameter than the ball 342 such that the ball 342 is blocked by the stopping portion 362 to remain in the receiving space 361 in normal situation.

The stopping unit 37, which is composed of a bushing 371 having a through hole 3711 and an oil seal 372 installed in the through hole 3711 of the bushing 371, is positioned behind the thermally-sensitive member 36. The through hole 3711 of the bushing 371 has a larger inner diameter than the ball 342 and the oil seal 372 has a smaller inner diameter than the ball 342 for stopping against the ball 342. Once the main body 12 is overheated, the thermally-sensitive member 36 will soften, deform, and even melt due to its low melting point. Accordingly, the ball 342 is biased by the spring 341 to break through the stopping portion 362 of the thermally-sensitive member 36 and to move along a longitudinal axle of the main body 12 to contact against the oil seal 372 of the stopping unit 37, such that the gas passage defined by the longitudinal through hole, i.e. the first chamber 22 and the second chamber 24, of the main body 12 is blocked off.

The overflow control valve 16 is mounted in the second chamber 24 of the main body 12 closely behind the thermally-sensitive control valve 14. The overflow control valve 16 is composed of a restraining piece 161 having a gateway 27 in alignment with the through hole 3711 of the bushing 371, a ball 162 and a sealing piece 163 having a through hole 1631. The overflow control valve 16 is provided for the ball 162 immediately blocking off the through hole 1631 of the sealing piece 163 while the pressure difference is abnormally high. Accordingly, the gas passage is blocked off such that gas leakage is stopped. The structure and principle of the overflow control valve 16, which is well known for people who are skilled in the art, will not be clarified thereafter.

Figure 4:
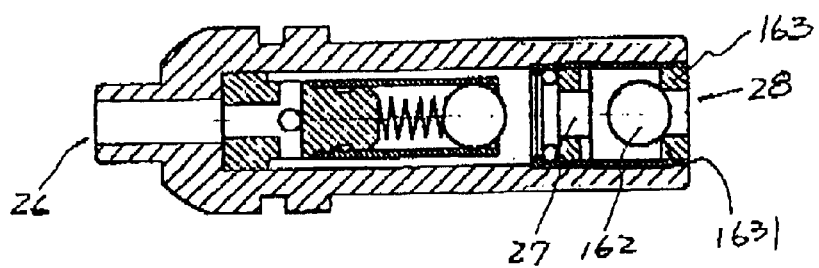
FIG. 4 is a sectional view of the preferred embodiment of the present invention, showing that when gas flowed in the gas passage is overflowed in normal temperature, the gas passage is also blocked off.
Figure 3:
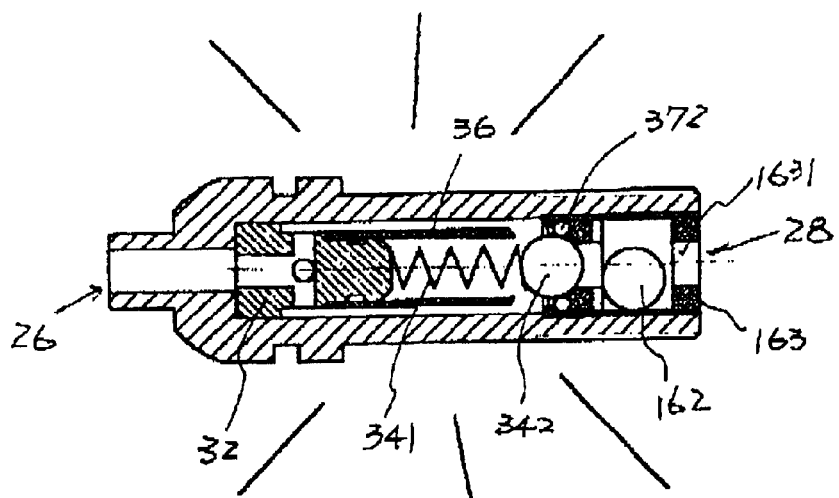
FIG. 3 is schematic view of the preferred embodiment of the present invention at work, showing that when ambient temperature abnormally rises, a thermally-sensitive member melts and then a biasing unit blocks off a gas passage.

The thermally-sensitive safety device 10 can be installed to gas supply facility with the inlet 26 thereof coupling with a gas supply tube and the outlet 28 coupling with a gas outgoing tube. As shown in FIG. 3, once on fire, the thermally-sensitive member 36 will melt while the thermally-sensitive control valve 14 detects ambient temperature higher than the melting point thereof and then the ball 342 is axially biased by the spring 341 to contact against the oil seal 372 inside the bushing 371, thereby the gas passage is blocked off between the inlet 26 and the outlet 28. Accordingly, the gas is prevented from flowing out of the outlet 28 such that the thermally-sensitive safety device 10 can successfully avoid accidental explosions. Alternatively, referring to FIG. 4, once the pressure difference of the gas is abnormally high, the overflow control valve 16 of the present invention is provided for immediately preventing the gas from leaking such that the present invention is blastproof in various different accidents.

In conclusion, the thermally-sensitive safety device of the present invention is provided to block off the gas passage of gas tubing so as to avoid accidental explosions while the ambient temperature is abnormally high. Additionally, the thermally-sensitive safety device of the present invention is provided to block off the gas passage of the gas tubing so as to prevent the gas flowed in the gas passage from being overflowed.

What is claimed is:

1. A thermally-sensitive safety device, comprising:

a main body provided with an inlet, an outlet and a gas passage communicated with said inlet and said outlet; and a thermally-sensitive control valve having a restraining member mounted in the gas passage adjacent to the inlet and having an admission aperture in communication with the inlet, a biasing unit mounted closely behind said restraining member and having an elastomer and a ball biased by said elastomer, a thermally-sensitive member installed in the gas passage and having a receiving space for receiving a distal end of said restraining member, said elastomer and said ball, and a stopping portion disposed at a distal end thereof for stopping and keeping said ball in said receiving space in normal situation, and a stopping unit mounted in the gas passage behind said biasing unit and having a bushing with a through hole in alignment with said ball, and an oil seal installed in the through hole of the bushing;

wherein said through hole of the bushing has a larger inner diameter than said ball and said oil seal has a smaller inner diameter than said ball;

wherein said thermally-sensitive member melts while ambient temperature is higher than the melting point thereof, whereby said ball is biased by said elastomer to contact against the oil seal so as to seal the through hole of the bushing such that the gas passage is blocked off.

2. The thermally-sensitive safety device as defined in claim 1, wherein said elastomer is a spring.

3. The thermally-sensitive safety device as defined in claim 1 further comprising an overflow control valve mounted in said gas passage closely behind said stopping unit, said overflow control valve having a restraining piece, a ball, and a sealing piece for blocking off gas passage while pressure difference of gas is abnormally high.

* * * * *